(12) United States Patent
Mori et al.

(10) Patent No.: US 9,679,715 B2
(45) Date of Patent: Jun. 13, 2017

(54) VEHICLE SWITCH DEVICE (71) Applicants: Koji Mori, Aichi (JP); Mamoru Minamide, Aichi (JP)

(72) Inventors: Koji Mori, Aichi (JP); Mamoru Minamide, Aichi (JP)

(73) Assignee: OMRON AUTOMOTIVE ELECTRONICS CO., LTD., Aichi (JP)

(*) Notice: Subject to any disclaimer, the term of this patent is extended or adjusted under 35 U.S.C. 154(b) by 37 days.

(21) Appl. No.: 14/811,348

(22) Filed: Jul. 28, 2015

(65) Prior Publication Data
US 2016/0027596 A1 Jan. 28, 2016

(30) Foreign Application Priority Data
Jul. 28, 2014 (JP) ................ 2014-152813

(51) Int. Cl.
H01H 13/70 (2006.01)
H01H 13/84 (2006.01)
(Continued)

(52) U.S. Cl.
CPC ......... *H01H 13/7013* (2013.01); *B60K 35/00* (2013.01); *B60N 2/466* (2013.01);
(Continued)

(58) Field of Classification Search
CPC ...... B60N 2/4693; B60N 2/466; B60K 35/00; H01H 23/003; H01H 13/7013;
(Continued)

(56) References Cited

U.S. PATENT DOCUMENTS 4,795,862 A * 1/1989 Linden ................ H01H 25/041
200/5 R
5,557,080 A 9/1996 Hayakawa
(Continued)

FOREIGN PATENT DOCUMENTS

JP S60-59910 U 4/1985
JP S63-58437 U 4/1988
(Continued)

OTHER PUBLICATIONS

Office Action in counterpart Japanese Patent Application No. 2014-152813 issued Nov. 22, 2016 (9 pages).

*Primary Examiner* — Edwin A. Leon
(74) *Attorney, Agent, or Firm* — Thomas K. Scherer (57) ABSTRACT A vehicle switch device has a selection switch having an operation part that, when operated, selects at least one of a plurality of driving target vehicle components mounted on a vehicle, and an operation switch that is separately operable from the selection switch, and drives the selected driving target vehicle component when operated. The operation switch has a single holding operation knob that swings so as to have a front portion thereof pushed down or pulled up. The single holding operation knob is structured to allow a palm of a hand to be placed on an upper face thereof, and fingers of the hand other than a thumb to be placed on the front portion. The operation part is disposed on a side face of the holding operation knob.

3 Claims, 6 Drawing Sheets (51) Int. Cl.
*B60N 2/46* (2006.01)
*B60K 35/00* (2006.01)
*H01H 23/00* (2006.01)

(52) U.S. Cl.
CPC .......... *B60N 2/4693* (2013.01); *H01H 13/84* (2013.01); *H01H 23/003* (2013.01); *H01H 2217/00* (2013.01); *H01H 2217/032* (2013.01); *H01H 2221/018* (2013.01); *H01H 2231/026* (2013.01); *H01H 2300/01* (2013.01)

(58) Field of Classification Search
CPC ............... H01H 13/84; H01H 2217/00; H01H 2300/01; H01H 2217/032; H01H 2221/018; H01H 2231/026
USPC .............. 200/5 A, 5 R, 52 R, 61.85, 61.58 R
See application file for complete search history.

(56) References Cited

U.S. PATENT DOCUMENTS

| | | | | |
|---|---|---|---|---|
| 6,903,288 B2* | 6/2005 | Varga | ..................... | H01H 25/04 200/200 |
| 2015/0318128 A1* | 11/2015 | Noh | ....................... | H01H 25/04 200/4 |

FOREIGN PATENT DOCUMENTS

| | | |
|---|---|---|
| JP | H07-249339 A | 9/1995 |
| JP | H11-70843 A | 3/1999 |
| JP | H11-208385 A | 8/1999 |
| JP | 2010-024663 A | 2/2010 |

\* cited by examiner

VEHICLE SWITCH DEVICE

CROSS-REFERENCE TO RELATED APPLICATION

This application is based on Japanese Patent Application No. 2014-152813 filed with the Japan Patent Office on Jul. 28, 2014, the entire contents of which are incorporated herein by reference.

FIELD

The present invention relates to a vehicle switch device, such as a power window switch device, which operates a vehicle component mounted on a vehicle.

BACKGROUND

There is, for example, a power window switch device as a vehicle switch device. The power window switch device is mounted on a vehicle and operates the opening/closing of a window for each seat in the vehicle. There is, for example, a power window switch device disposed on an armrest of a door for a driver seat as disclosed in JP 11-70843 A, JP 11-208385 A, JP 63-58437 Y, and JP 7-249339 A.

There is also a power window switch device provided with a plurality of window opening/closing switches for the respective windows, the window opening/closing switches being operated for opening and closing the respective windows, as disclosed in JP 11-70843 A and JP 11-208385 A.

In JP 11-70843 A, a case of a power window switch device is disposed on an armrest and can be held with a single hand. On the upper face of the case, four operation knobs of a window opening/closing switch are disposed. The four operation knobs are operated for opening and closing windows for the respective seats (a driver seat, a front passenger seat, and right and rear left seats). Each of the operation knobs can be operated to swing with an index finger or a middle finger. A mirror control switch which is operated for changing the angle of a side mirror in the vehicle is disposed on the side face of the case. The mirror control switch is provided with a slide knob which selects right and left mirrors, a multidirectional switch knob which changes the angle of the mirrors, and a pressing knob which opens and closes the mirrors. Each of the knobs of the mirror control switch is operated with a thumb.

In JP 11-208385 A, a crown-shaped curved part is formed on the front part of an armrest, and four operation knobs of a window opening/closing switch are disposed on the inner bottom of the crown-shaped curved part into which a hand can be inserted. Further, an operation switch for operating an audio or a navigation is disposed on the upper end of the crown-shaped curved part.

Further, an operation switch for a power seat is disposed on the side face of the armrest. The operation knobs of the window opening/closing switch and an operation knob for the audio can be operated with an index finger or a middle finger and the operation switch for the power seat can be operated with a thumb with an arm put on the armrest.

As disclosed in JP 63-58437 Y and JP 7-249339 A, there is also a power window switch device which is provided with a window selection switch operated for selecting an opening/closing target window to reduce the number of window opening/closing switches.

In JP 63-58437 Y, an operation knob of a window opening/closing switch for a right window and an operation knob of a window opening/closing switch for a left window are disposed on the upper face of an operation board of a power window switch device. A projecting operation part for allowing the operation board to slide between a position for selecting front seat windows and a position for selecting rear seat windows is disposed on the side face of the operation board. The operation knob of each of the window opening/closing switches can be operated with an index finger or a middle finger and the projecting operation part can be operated with a thumb with an arm put on the armrest.

In JP 7-249339 A, a case of a power window switch device is disposed on an armrest and can be held with a single hand. An operation knob of a window opening/closing switch for a right front seat window and an operation knob of a window opening/closing switch for a left front seat window are disposed on the front part of the case. A single operation knob of a window selection switch for selecting rear seat windows is disposed on the side face of the case. The operation knob of each of the window opening/closing switches can be operated to swing with an index finger or a middle finger and the operation knob of the window selection switch can be operated with a thumb with the case held with a single hand.

Conventionally, a plurality of small operation knobs of a window opening/closing switch are provided so as to be operated with an index finger or a middle finger of a single hand. However, it is difficult to accurately engage a single finger with an operation knob corresponding to an opening/closing target window to operate. In particular, when two operation knobs of a window opening/closing switch are arranged on each of the front and back sides, it is necessary to move an index finger or a middle finger back and forth or right and left so as to be engaged with an operation knob corresponding to an opening/closing target window. Thus, the operation is complicated, and an incorrect operation knob may be erroneously operated. When two operation knobs of a window opening/closing switch are arranged side by side on the right and left sides, an index finger and a middle finger can be engaged with the respective operation knobs. However, since there are two operation knobs, an operator may be confused which finger is engaged with an operation knob corresponding to an opening/closing target window in an instant operation, which may cause an operating error.

SUMMARY

An object of the present invention is to provide a vehicle switch device capable of preventing an operating error while improving the operability.

A vehicle switch device according to the present invention is provided with an operation switch configured to be operated for driving a vehicle component mounted on a vehicle and a selection switch configured to be operated for selecting a driving target vehicle component. The operation switch includes a single holding operation knob configured to be operated to swing to be pushed down or pulled up by putting a palm of a hand on an upper face of the holding operation knob and holding the holding operation knob in a wrapped state with fingers other than a thumb and the palm of the hand. The selection switch includes an operation part disposed on a side face of the holding operation knob, the operation part configured to be operated with a thumb of a hand holding the holding operation knob.

In the above vehicle switch device, a driving target vehicle component can be selected by operating the operation part of the selection switch with a thumb of a hand with the holding operation knob of the operation switch held with the hand. Then, the driving target vehicle component can be driven by operating the holding operation knob to swing. Thus, it is not necessary to move a hand or fingers other than a thumb of the hand back and forth or right and left to operate the operation switch or the selection switch. Therefore, the operation is not complicated, and the operability can be improved. Since only the single holding operation knob of the operation switch is provided and the operation part of the selection switch can be stably operated with a thumb of a hand, it is possible to prevent an operating error in the operation switch and the selection switch.

In the present invention, in the vehicle switch device, the holding operation knob may be disposed on an armrest of a door for a driver seat in a vehicle, an engagement part configured to be engaged with fingers other than a thumb of a hand may be formed on a front part of the holding operation knob, and the holding operation knob may be held by putting a palm of a hand on the upper face of the holding operation knob and engaging fingers other than a thumb of the hand with the engagement part with the fingers bent.

In the present invention, the vehicle component may be a window for each seat in a vehicle, the vehicle switch device may be a power window switch device configured to open and close the window, the operation switch may be a window opening/closing switch configured to be operated for opening and closing the window, and the selection switch may be a window selection switch configured to be operated for selecting an opening/closing target window. In this case, the holding operation knob may be configured to be operated to swing by two stages in a pushing-down direction and a pulling-up direction. In this case, the holding operation knob is operated to swing by one stage in the pushing-down direction or the pulling-up direction to open or close a window selected by the window selection switch during the operation. Further, the holding operation knob is operated to swing by two stages in the pushing-down direction or the pulling-up direction to fully open or fully close a window selected by the window selection switch.

In the present invention, in the vehicle switch device, a window for a driver seat, a window for a front passenger seat, a window for a rear right seat, or a window for a rear left seat may be selected by operating the operation part of the window selection switch.

In the present invention, the vehicle switch device may be further provided with a display configured to display a window selected by the window selection switch. The display may be disposed in front of the holding operation knob so as to be visually recognizable from a holding direction of the holding operation knob.

The present invention makes it possible to provide a vehicle switch device capable of preventing an operating error while improving the operability.

DETAILED DESCRIPTION

Hereinbelow, an embodiment of the present invention will be described with reference to the drawings. Identical reference numerals designate identical or equivalent elements throughout the drawings.

First, the configuration of a power window system 100 according to the embodiment will be described with reference to FIG. 1.

Figure 1:
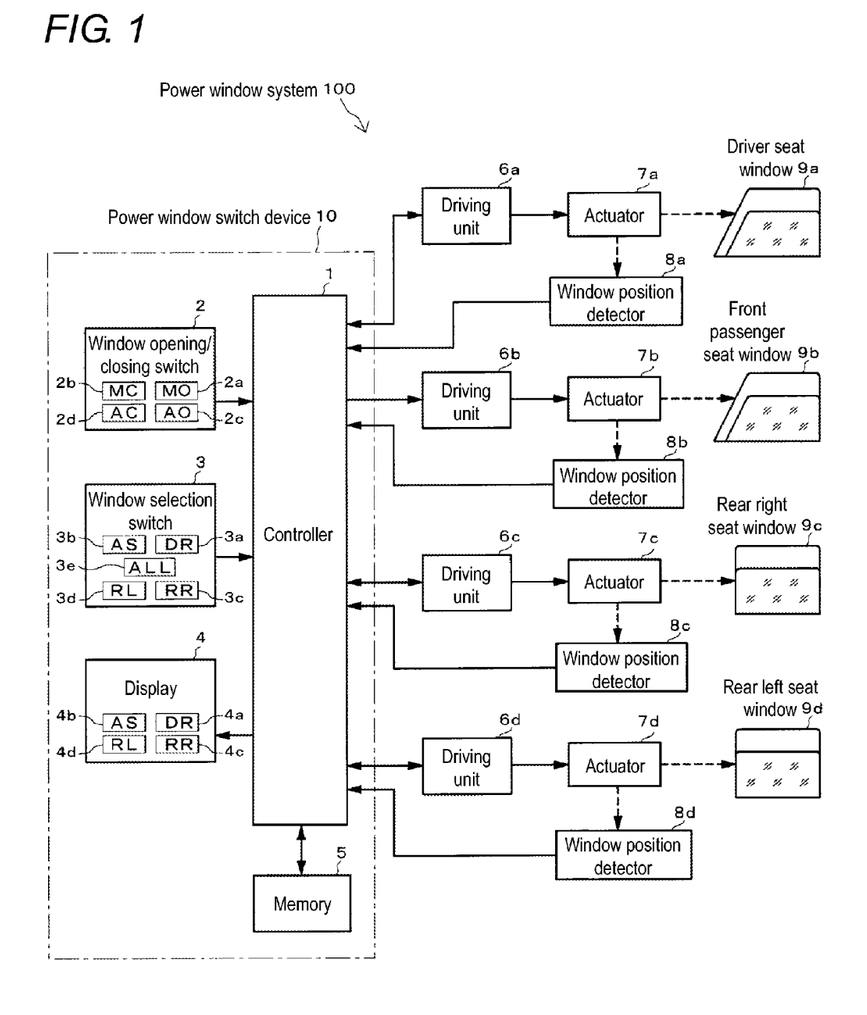
FIG. 1 is a diagram illustrating the configuration of a power window system according to an embodiment of the present invention.

In FIG. 1, the power window system 100 is mounted on an automatic four-wheel vehicle (hereinbelow, referred to as "the vehicle"). The power window system 100 includes a power window switch device 10, driving units 6a to 6d, actuators 7a to 7d, window position detectors 8a to 8d, and windows 9a to 9d for seats. The windows 9a to 9d which are opened and closed by the power window system 100 include the window 9a for a driver seat, the window 9b for a front passenger seat, the window 9c for a rear right seat, and the window 9d for a rear left seat in the vehicle. The power window switch device 10 is an example of "a vehicle switch device" of the present invention. Each of the windows 9a to 9d is an example of "a vehicle component" of the present invention.

The actuators 7a to 7d include motors or opening/closing mechanisms for opening and closing window glasses of the respective windows 9a to 9d. The driving units 6a to 6d include circuits for driving the respective actuators 7a to 7d. The window position detectors 8a to 8d detect the opening/closing positions of the window glasses of the respective windows 9a to 9d.

The power window switch device 10 is provided with a controller 1, a window opening/closing switch 2, a window selection switch 3, a display 4, and a memory 5. The controller 1 includes a microcomputer. The memory 5 includes a memory such as a ROM and a RAM.

The window opening/closing switch 2 is operated for opening and closing each of the windows 9a to 9d of the vehicle. The window opening/closing switch 2 is provided with, as electric switches, a manual open (MO) switch 2a, a manual close (MC) switch 2b, and automatic open (AO) switch 2c, and an automatic close (AC) switch 2d. The window opening/closing switch 2 is an example of "an operation switch" of the present invention.

The window selection switch 3 is operated for selecting the window 9a, 9b, 9c or 9d to be an opening/closing target. The window selection switch 3 is provided with, as electric switches, a DR switch 3a which corresponds to the window 9a for the driver seat, an AS switch 3b which corresponds to the window 9b for the front passenger seat, an RR switch 3c which corresponds to the window 9c for the rear right seat, and an RL switch 3d which corresponds to the window 9d for the rear left seat. The window selection switch 3 is further provided with, as an electric switch, an ALL switch 3e for selecting all the windows 9a to 9d at once. The window selection switch 3 is an example of "a selection switch" of the present invention.

The display 4 displays the opening/closing target window 9a, 9b, 9c or 9d selected by the window selection switch 3. The display 4 is provided with a DR light emitter 4a, an AS light emitter 4b, an RR light emitter 4c, and an RL light emitter 4d. These DR, AS, RR and RL light emitters 4a to 4d include, for example, light emitting diodes (LEDs).

When the window selection switch 3 is operated to turn on the DR switch 3a, the controller 1 determines that the window 9a for the driver seat has been selected and allows the DR light emitter 4a corresponding to the window 9a to emit light. When the AS switch 3b is turned on, the controller 1 determines that the window 9b for the front passenger seat has been selected and allows the AS light emitter 4b corresponding to the window 9b to emit light. When the RR switch 3c is turned on, the controller 1 determines that the window 9c for the rear right seat has been selected and allows the RR light emitter 4c corresponding to the window 9c to emit light. When the RL switch 3d is turned on, the controller 1 determines that the window 9d for the rear left seat has been selected and allows the RL light emitter 4d corresponding to the window 9d to emit light. When the ALL switch 3e is turned on, the controller 1 determines that all the windows 9a to 9d have been selected and allows all the DR, AS, RR and RL light emitters 4a to 4d to emit light.

After the window selection switch 3 selects the opening/closing target window 9a, 9b, 9c or 9d, the window opening/closing switch 2 performs an opening/closing operation as described below. Accordingly, the controller 1 drives the actuator 7a, 7b, 7c or 7d by the driving unit 6a, 6b, 6c or 6d corresponding to the opening/closing target window 9a, 9b, 9c or 9d to manually or automatically open or close the window glass of the opening/closing target window 9a, 9b, 9c or 9d.

Next, the configuration of the power window switch device 10 will be described with reference to FIGS. 2 to 10.

Figure 2:
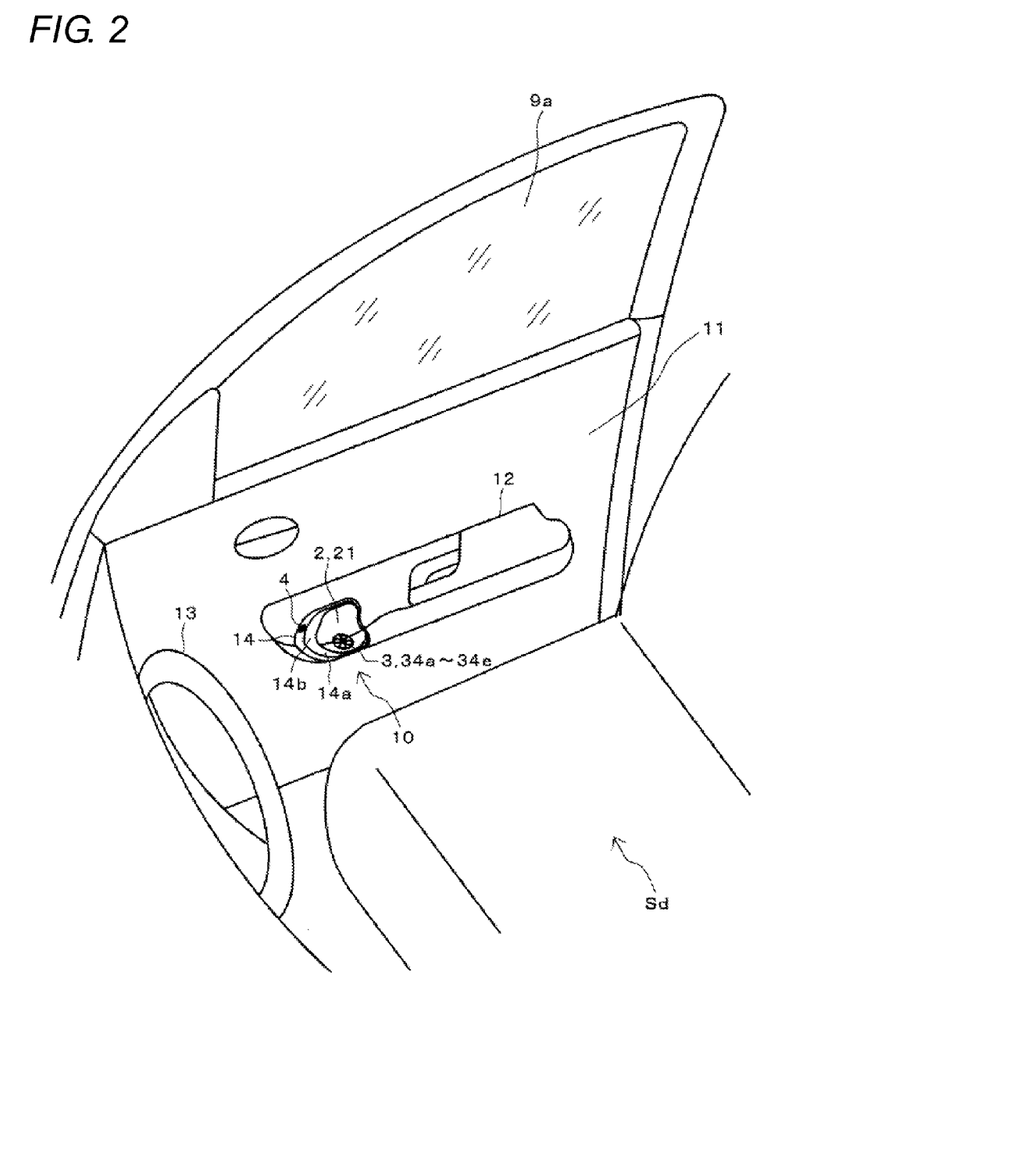
FIG. 2 is a diagram illustrating an installation example of a power window switch device according to the embodiment of the present invention.
Figure 3:
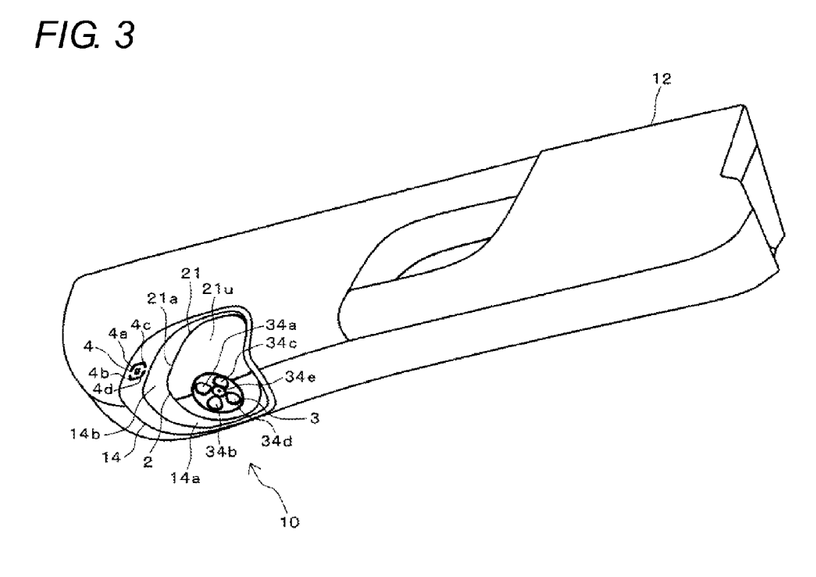
FIG. 3 is an enlarged view of the power window switch device and an armrest in FIG. 2.
Figure 4:
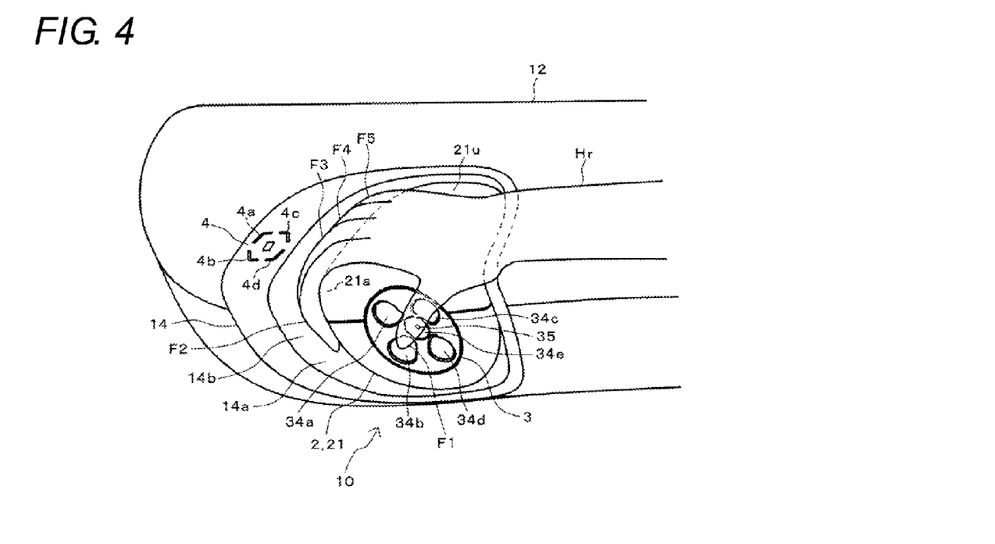
FIG. 4 is a diagram illustrating a held state of a holding operation knob in FIG. 2.

FIG. 2 is a diagram illustrating an installation state of the power window switch device 10. FIG. 3 is an enlarged view of the power window switch device 10 and an armrest 12 in which the power window switch device 10 is installed. FIG. 4 is a diagram illustrating a held state of a holding operation knob 21 provided in the power window switch device 10.

Figure 5:
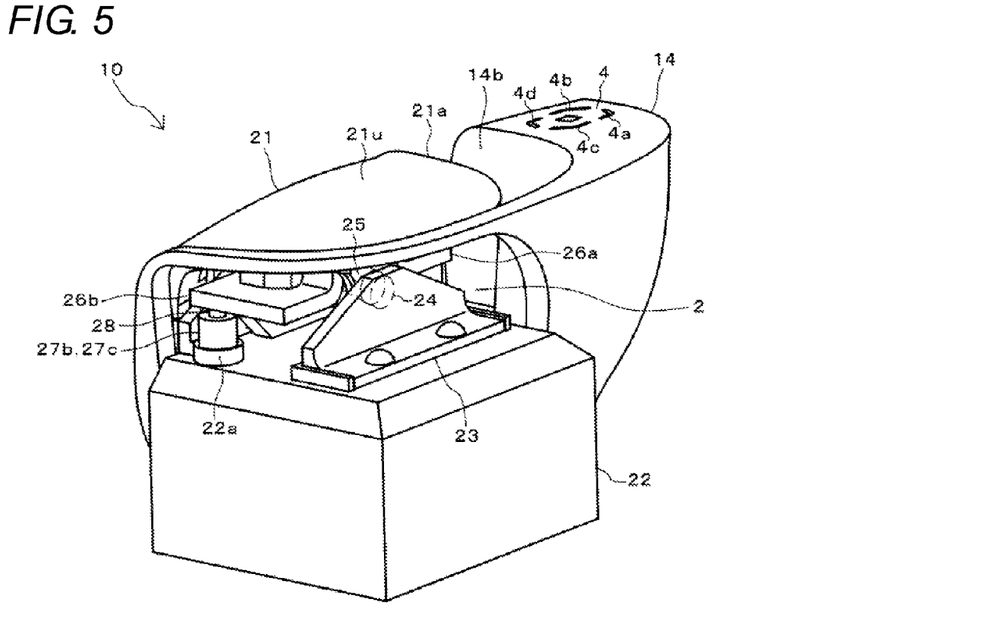
FIG. 5 is a diagram illustrating a support structure of the holding operation knob in FIG. 2.
Figure 6:
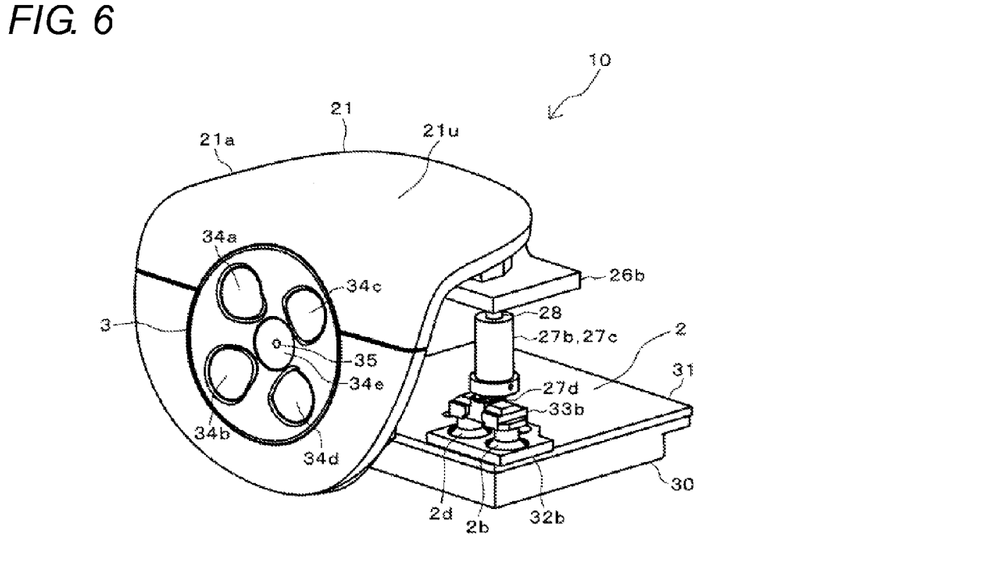
FIG. 6 is a diagram illustrating an internal structure of the power window switch device in FIG. 2.
Figure 7:
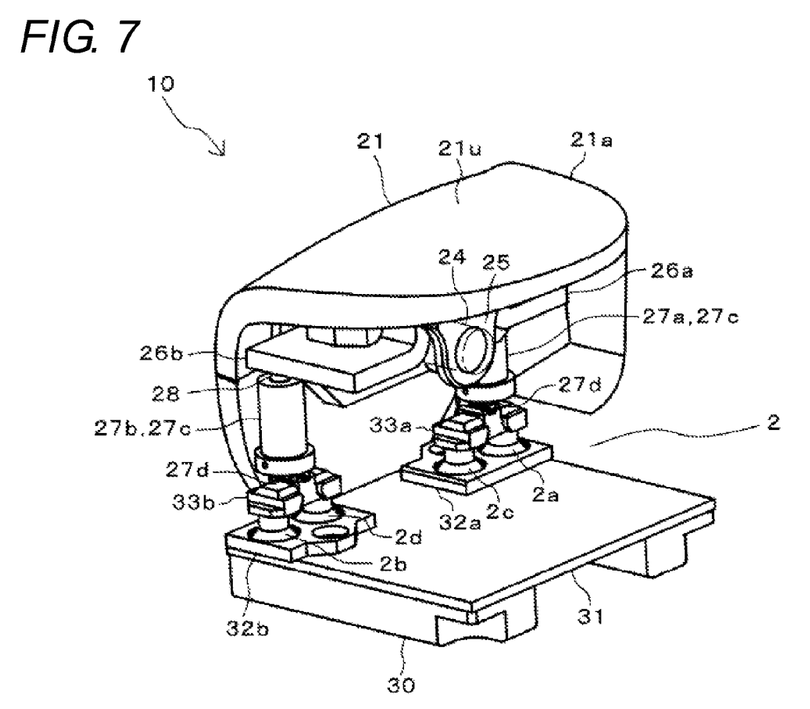
FIG. 7 is a diagram illustrating the internal structure of the power window switch device in FIG. 2.
Figure 8:
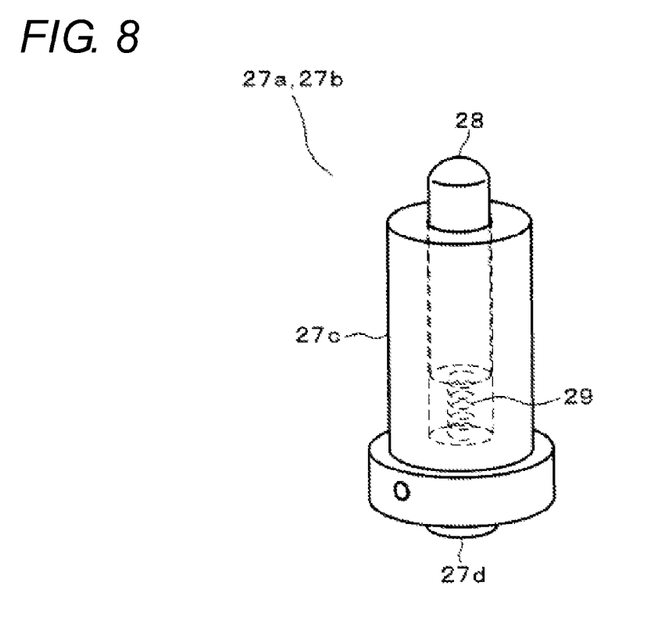
FIG. 8 is a diagram illustrating a plunger in FIGS. 5 to 7.
Figure 9:
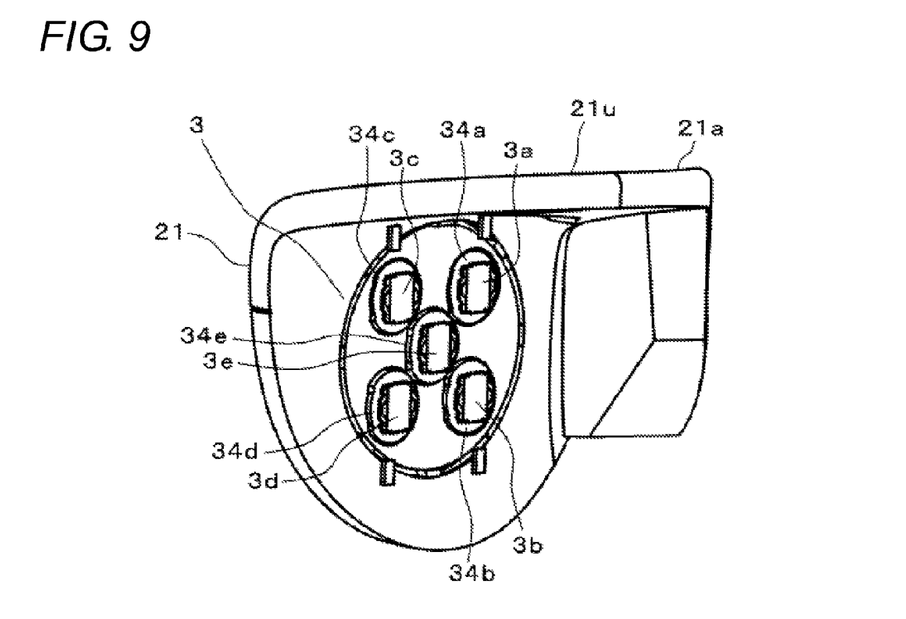
FIG. 9 is a diagram illustrating the back side of the holding operation knob of the power window switch device in FIG. 2.
Figure 10:
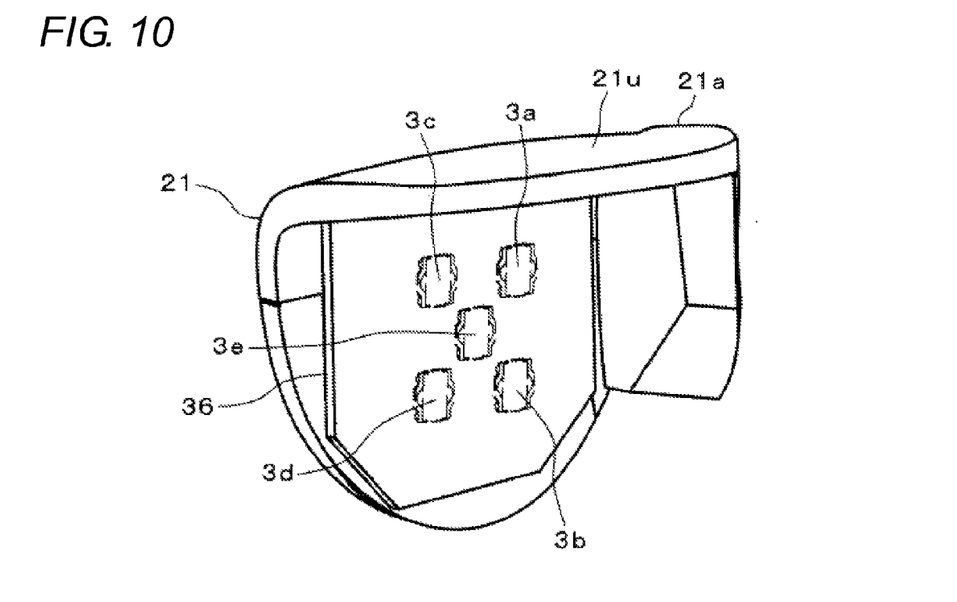
FIG. 10 is a diagram illustrating the back side of the holding operation knob of the power window switch device in FIG. 2.

FIG. 5 is a diagram illustrating a support structure of the holding operation knob 21. FIGS. 6 and 7 are diagrams illustrating an internal configuration of the power window switch device 10. FIGS. 5 and 7 illustrate the inside of the power window switch device 10 viewed from a door 11 for the driver seat Sd. FIG. 6 illustrates the inside of the power window switch device 10 viewed from the driver seat Sd. FIG. 8 is an enlarged view of a plunger 27a or 27b in FIGS. 5 to 7. FIGS. 9 and 10 are diagrams illustrating the back side of the holding operation knob 21 viewed from the door 11 for the driver seat Sd.

As illustrated in FIG. 2, the power window switch device 10 is disposed on the armrest 12 on the door 11 for the driver seat Sd of the vehicle. The vehicle in this example is an automatic four-wheel vehicle with a right-hand steering wheel.

The window opening/closing switch 2 provided in the power window switch device 10 has the single holding operation knob 21. As illustrated in FIGS. 3 and 4, the holding operation knob 21 is disposed on a depression 14a of a bezel 14 which is attached to the front part of the armrest 12 with the upper face and the left side face of the holding operation knob 21 exposed. The upper face and the left side face of the holding operation knob 21 are substantially flush with the upper face and the left side face of the armrest 12, respectively.

A recess 14b is formed between the front side (the side corresponding to a handle 13 in FIG. 2) of the holding operation knob 21 and the bezel 14. As illustrated in FIG. 4, an engagement part 21a is formed on the front part of the holding operation knob 21. Fingers F2 to F5 other than a thumb F1 of a hand (right hand) Hr are engaged with the engagement part 21a. The engagement part 21a projects forward in a circular arc shape. A driver sitting on the driver seat Sd puts the palm of the right hand Hr on an upper face 21u of the holding operation knob 21 from the upper side, and inserts the fingers F2 to F5 other than the thumb F1 of the right hand Hr into the recess 14b to engage the fingers F2 to F5 with the engagement part 21a with the fingers F2 to F5 bent. Accordingly, the holding operation knob 21 is held in a wrapped state with the fingers F2 to F5 other than the thumb F1 and the palm of the hand (right hand) Hr.

As illustrated in FIG. 5, a case 22 is disposed inside the armrest 12. The case 22 is fixed to the bezel 14 and the door 11. A bracket 23 is fixed onto the case 22. A support shaft 24 is fixed to the bracket 23 in a manner to project toward the driver seat Sd.

As illustrated in FIGS. 5 and 7, a bearing 25 is fixed to the center of an inner top face of the holding operation knob 21. The holding operation knob 21 is supported on the case 22 by inserting the support shaft 24 into the bearing 25.

When the holding operation knob 21 is held with the right hand Hr as illustrated in FIG. 4 and the front part (the part near the engagement part 21a) of the holding operation knob 21 is pushed down, the holding operation knob 21 swings around the support shaft 24 in a forward tilting manner. On the other hand, when the front head part near the engagement part 21a is pulled up, the holding operation knob 21 swings around the support shaft 24 in a backward tilting manner. That is, the holding operation knob 21 can be operated to swing to be pushed down or pulled up with the holding operation knob 21 held with the hand Hr.

As illustrated in FIGS. 5 to 7, pressing plates 26a and 26b are fixed to the front and rear ends of the inner top face of the holding operation knob 21. The plungers 27a and 27b are disposed under the pressing plates 26a and 26b, respectively (FIG. 7). As illustrated in FIG. 5, each of the plungers 27a and 27b penetrates a cylinder 22a which is disposed on the case 22. A tube 27c of each of the plungers 27a and 27b is fixed to the case 22.

As illustrated in FIG. 8, a pin 28 which projects from the upper face of the tube 27c of each of the plungers 27a and 27b is inserted into the tube 27c movably up and down. The pins 28 are pressed from the upper side by the respective pressing plates 26a and 26b. A spring 29 located inside each of the tubes 27c biases the pin 28 upward. A lower projection 27d which projects from the lower face of the tube 27c of each of the plungers 27a and 27b is fixed to the tube 27c.

As another example, the lower projection 27d may be inserted into the tube 27c movably up and down and biased downward by a spring as with the pin 28.

The lower side of the case 22 illustrated in FIG. 5 is open and covered with a cover 30 illustrated in FIGS. 6 and 7. The case 22 and the cover 30 are fixed to each other with, for example, a screw. The cover 30 and the bezel 14 are fixed to each other also with, for example, a screw. A main board 31 is fixed onto the cover 30. An IC chip which constitutes the controller 1 and the memory 5 is mounted on the main board 31.

As illustrated in FIG. 7, the MO switch 2a and the AO switch 2c are disposed on the front part of the main board 31. The MC switch 2b and the AC switch 2d are disposed on the rear part of the main board 31. These MO, MC, AO and AC switches 2a to 2d include rubber contact switches. Fixed contacts of the MO, MC, AO and AC switches 2a to 2d are formed on the main board 31 (not illustrated). Rubbers (with no reference numeral) of the MO, MC, AO and AC switches 2a to 2d are retained on the respective fixed contacts formed on the main board 31 by retainer members 32a and 32b. Movable contacts (not illustrated) are formed inside the respective rubbers of the MO, MC, AO and AC switches 2a to 2d.

A pressing piece 33a is placed on the MO switch 2a and the AO switch 2c. A pressing piece 33b is placed on the MC switch 2b and the AC switch 2d. The lower projection 27d of the plunger 27a and the lower projection 27d of the plunger 27b are engaged with the upper part of the pressing pieces 33a and the upper part of the pressing piece 33b, respectively.

Specifically, the lower projection 27d of the plunger 27a is engaged with the upper part of the pressing piece 33a at a position between an intermediate position between the MO switch 2a and the AO switch 2c, and the MO switch 2a. The lower projection 27d of the plunger 27b is engaged with the upper part of the pressing piece 33b at a position between an intermediate position between the MC switch 2b and the AC switch 2d, and the MC switch 2b.

As illustrated in FIGS. 2 to 4, and 6, operation parts 34a to 34e of the window selection switch 3 are disposed on the left side face of the holding operation knob 21 of the window opening/closing switch 2. Specifically, the operation parts 34a to 34e of push button type are exposed through five holes which are open on the left side face of the holding operation knob 21. Thus, as illustrated in FIG. 4, each of the operation parts 34a to 34e can be pressed with the thumb F1 of the right hand Hr holding the holding operation knob 21. The exposed surface of each of the operation parts 34a to 34e may slightly project from, may be slightly recessed from, or may be flush with the left side face of the holding operation knob 21.

The operation parts 34a to 34d are arranged at equal angular intervals around the operation part 34e. Specifically, the operation part 34a is arranged on the front upper side of the operation part 34e. The operation part 34b is arranged on the front lower side of the operation part 34e. The operation part 34c is arranged on the rear upper side of the operation part 34e. The operation part 34d is arranged on the rear lower side of the operation part 34e.

Such a positional relationship between the operation parts 34a to 34e corresponds to the positional relationship between the driver seat Sd and the windows 9a to 9d. A small projection 35 is formed on the operation part 34e located on the center so that each of the operation parts 34a to 34e can be recognized without looking at the operation parts 34a to 34e.

As illustrated in FIG. 9, the DR switch 3a is arranged on the back side of the operation part 34a. The AS switch 3b is arranged on the back side of the operation part 34b. The RR switch 3c is arranged on the back side of the operation part 34c. The RL switch 3d is arranged on the back side of the operation part 34d. The ALL switch 3e is arranged on the back side of the operation part 34e. Each of the DR, AS, RR, RL and ALL switches 3a to 3e includes a push switch. As illustrated in FIG. 10, the DR, AS, RR, RL and ALL switches 3a to 3e are mounted on a sub board 36 which are disposed on the inner side of the holding operation knob 21. In FIG. 9, the sub board 36 is not illustrated.

Specifically, the sub board 36 on which the DR, AS, RR, RL and ALL switches 3a to 3e are mounted is fixed to the inner side of the holding operation knob 21, so that the DR, AS, RR, RL and ALL switches 3a to 3e are arranged on the back side of the operation parts 34a to 34e, respectively. The DR, AS, RR, RL and ALL switches 3a to 3e are turned on by pressing the operation parts 34a to 34e, respectively. In this example, each of the DR, AS, RR, RL and ALL switches 3a to 3e is composed of a tactile switch. However, for example, a rubber contact switch may be used instead of a tactile switch.

The sub board 36 is fixed to the inner side face of the holding operation knob 21 with, for example, a screw (not illustrated). The sub board 36 is electrically connected to the main board 31 (FIG. 6) by a connection member (not illustrated).

As illustrated in FIGS. 2 to 5, the display 4 is disposed on the bezel 14 in front of the holding operation knob 21. The upper face of the bezel 14 is flush with the upper face of the armrest 12.

In the display 4, the DR light emitter 4a is arranged on the front right side, the AS light emitter 4b is arranged on the front left side, the RR light emitter 4c is arranged on the rear right side, and the RL light emitter 4d is arranged on the rear left side. These DR, AS, RR and RL light emitters 4a to 4d are visually recognizable from a holding direction of the holding operation knob 21 (upper side).

Next, the action of the power window switch device 10 will be described.

When the operation part 34a of the window selection switch 3 is pressed with the thumb F1 with the holding operation knob 21 of the window opening/closing switch 2 held with the right hand Hr as illustrated in FIG. 4, the DR switch 3a is turned on, and the controller 1 determines that the window 9a for the driver seat Sd has been selected. When the operation part 34b is pressed with the thumb F1, the AS switch 3b is turned on, and the controller 1 determines that the window 9b for the front passenger seat has been selected. When the operation part 34c is pressed with the thumb F1, the RR switch 3c is turned on, and the controller 1 determines that the window 9c for the rear right seat has been selected. When the operation part 34d is pressed with the thumb F1, the RL switch 3d is turned on, and the controller 1 determines that the window 9d for the rear left seat has been selected. When the operation part 34e is pressed with the thumb F1, the ALL switch 3e is turned on, and the controller 1 determines that all the windows 9a to 9d for all the seats have been selected.

When the opening/closing target window 9a, 9b, 9c or 9d is selected as described above, the controller 1 allows the DR light emitter 4a, the AS light emitter 4b, the RR light emitter 4c or the RL light emitter 4d in the display 4 corresponding to the selected window 9a, 9b, 9c or 9d to emit light. For example, when any one of the windows 9a to 9d is selected, any one of the DR, AS, RR and RL light emitters 4a to 4d corresponding to the selected window emits light. On the other hand, when all the windows 9a to 9d are selected, all the DR, AS, RR and RL light emitters 4a to 4d emit light.

The selection of the windows 9a to 9d performed by the window selection switch 3 and the display of the selected windows 9a to 9d performed by the display 4 are updated every time when the operation parts 34a to 34e are operated.

After the selection of the opening/closing target window 9a, 9b, 9c or 9d, the front part of the holding operation knob 21 is operated to swing by one stage (swing angle θ1) in the pushing-down direction with the right hand Hr holding the holding operation knob 21. Accordingly, the pressing plate 26a on the front side illustrated in FIG. 7 pushes down the pin 28 of the plunger 27a. Further, the lower projection 27d of the plunger 27a presses the pressing piece 33a. Then, the pressing piece 33a is tilted forward to push down the rubber of the MO switch 2a to turn on the MO switch 2a. The reason why the pressing piece 33a is tilted rearward is that the position where the lower projection 27d of the plunger 27a presses the pressing piece 33a is closer to the MO switch 2a than the AO switch 2c. Thus, a force applied to the MO switch 2a from the plunger 27a is larger than a force applied to the AO switch 2c from the plunger 27a. Therefore, the pressing piece 33a is tilted forward in this manner. As described above, while the MO switch 2a is in an on state, the controller 1 drives the actuator 7a, 7b, 7c or 7d by the driving unit 6a, 6b, 6c or 6d corresponding to the opening/closing target window 9a, 9b, 9c or 9d to open the opening/closing target window 9a, 9b, 9c or 9d (so-called manual opening operation).

The front part of the holding operation knob 21 is operated to swing by two stages (swing angle θ2; θ2>θ1) in the pushing-down direction with the right hand Hr. Accordingly, the pressing plate 26a on the front side further pushes down the pin 28 of the plunger 27a, and the lower projection 27d of the plunger 27a further presses the pressing piece 33a.

As a result, the pressing piece 33a is displaced to be further tilted forward. However, since the MO switch 2a has already been displaced to close the contact (to become an on state), the pressing piece 33a is displaced to lower the rear part thereof to push down the rubber of the AO switch 2c. Therefore, not only the MO switch 2a, but also the AO switch 2c is turned on. In this manner, when the AO switch 2c is turned on once, the controller 1 drives the actuator 7a, 7b, 7c or 7d by the driving unit 6a, 6b, 6c or 6d corresponding to the opening/closing target window 9a, 9b, 9c or 9d to automatically fully open the opening/closing target window 9a, 9b, 9c or 9d (so-called automatic opening operation).

The front part of the holding operation knob 21 is operated to swing by one stage (swing angle θ3) in the pulling-up direction with the right hand Hr. Accordingly, the pressing plate 26b on the rear side pushes down the pin 28 of the plunger 27b. Further, the lower projection 27d of the plunger 27b presses the pressing piece 33b. Then, the pressing piece 33b is tilted rearward to push down the rubber of the MC switch 2b to turn on the MC switch 2b. As described above, the position where the lower projection 27d of the plunger 27b presses the pressing piece 33b is closer to the MC switch 2b than the AC switch 2d. Thus, a force applied to the MC switch 2b from the plunger 27b is larger than a force applied to the AC switch 2d from the plunger 27b. Therefore, the pressing piece 33b is tilted rearward in this manner. As described above, while the MC switch 2b is in an on state, the controller 1 drives the actuator 7a, 7b, 7c or 7d by the driving unit 6a, 6b, 6c or 6d corresponding to the opening/closing target window 9a, 9b, 9c or 9d to close the opening/closing target window 9a, 9b, 9c or 9d (so-called manual closing operation).

The front part of the holding operation knob 21 is operated to swing by two stages (swing angle θ4; θ4>θ3) in the pulling-up direction with the right hand Hr. Accordingly, the pressing plate 26b on the rear side further pushes down the pin 28 of the plunger 27b, and the lower projection 27d of the plunger 27b further presses the pressing piece 33b. As a result, the pressing piece 33b is displaced to be further tilted rearward. However, since the MC switch 2b has already been displaced to close the contact (to become an on state), the pressing piece 33b is displaced to lower the rear part thereof to push down the rubber of the AC switch 2d. Therefore, not only the MC switch 2b, but also the AC switch 2d is turned on. In this manner, when the AC switch 2d is turned on once, the controller 1 drives the actuator 7a, 7b, 7c or 7d by the driving unit 6a, 6b, 6c or 6d corresponding to the opening/closing target window 9a, 9b, 9c or 9d to automatically fully close the opening/closing target window 9a, 9b, 9c or 9d (so-called automatic closing operation).

In the above embodiment, it is possible to operate the operation part 34a, 34b, 34c, 34d or 34e of the window selection switch 3 with the thumb F1 of the hand (right hand) Hr with the holding operation knob 21 of the window opening/closing switch 2 held with the hand Hr to select the window 9a, 9b, 9c or 9d to be an opening/closing target. Thereafter, the opening/closing target window 9a, 9b, 9c or 9d can be opened or closed by operating the holding operation knob 21 to swing with the hand Hr. Thus, it is not necessary to move the hand Hr or the fingers F2 to F5 other than the thumb F1 of the hand Hr back and forth or right and left to operate the window opening/closing switch 2 or the window selection switch 3. Therefore, the operation is not complicated, and the operability can be improved. Since only the single holding operation knob 21 of the window opening/closing switch 2 is provided and the operation parts 34a to 34e of the window selection switch 3 can be stably operated with the thumb F1 of the hand Hr, it is possible to prevent an operating error in the window opening/closing switch 2 and the window selection switch 3.

In the above embodiment, the holding operation knob 21 is disposed on the armrest 12 of the door 11 for the driver seat Sd. Further, the palm of the hand Hr is put on the upper face of the holding operation knob 21 and the fingers F2 to F5 other than the thumb F1 of the hand Hr are inserted into the recess 14b of the bezel 14. Accordingly, it is possible to stably hold the holding operation knob 21 with the hand Hr and further improve the operability of the window opening/closing switch 2 and the window selection switch 3.

In the above embodiment, after the window selection switch 3 selects the opening/closing target window 9a, 9b, 9c or 9d, the holding operation knob 21 is operated to swing by one stage in the pushing-down direction or the pulling-up direction. This enables the opening/closing target window 9a, 9b, 9c or 9d to be manually opened or closed. Further, operating the holding operation knob 21 to swing by two stages in the pushing-down direction or the pulling-up direction enables the opening/closing target window 9a, 9b, 9c or 9d to be automatically fully opened or fully closed.

In the above embodiment, it is possible to operate the operation parts 34a to 34e of the window selection switch 3 with the thumb F1 of the hand Hr with the holding operation knob 21 held with the hand Hr without looking at the operation parts 34a to 34e. Further, it is possible to select any one of or all the window 9a for the driver seat Sd, the window 9b for the front passenger seat, the window 9c for the rear right seat, and the window 9d for the rear left seat in the vehicle by the operation on the operation parts 34a to 34e performed by the single thumb F1.

In the above embodiment, the display 4 which displays the window 9a, 9b, 9c or 9d selected by the window selection switch 3 is disposed in front of the holding operation knob 21 so as to be visually recognizable from the holding direction of the holding operation knob 21. Thus, even when the operation part 34a, 34b, 34c, 34d or 34e of the window selection switch 3 is operated without looking at the operation part 34a, 34b, 34c, 34d or 34e, it is possible to confirm the window 9a, 9b, 9c or 9d selected by the operation by visually observing the display 4. The window 9a, 9b, 9c or 9d to be opened or closed can be more reliably opened or closed by operating the holding operation knob 21 of the window opening/closing switch 2 to swing upon confirming that the selected window 9a, 9b, 9c or 9d is a target window 9a, 9b, 9c or 9d to be opened or closed. Therefore, it is possible to more effectively prevent an operating error in the window opening/closing switch 2 and the window selection switch 3.

The present invention may employ various embodiments other than the above embodiment. For example, the above embodiment shows an example in which the power window switch device 10 is disposed on the armrest 12 of the door 11 for the driver seat Sd in the vehicle. However, the present invention is not limited only thereto. For example, the power window switch device may be disposed on a door for a driver seat, a door for another seat, an armrest of a door for another seat, or an armrest located on the center of the vehicle.

The above embodiment shows an example in which the holding operation knob 21 is operated to swing to push down the pressing pieces 33a and 33b by the plungers 27a and 27b, respectively, to turn on the MO, MC, AO and AC switches 2a to 2d. However, the present invention is not limited only thereto. For example, four plungers may be provided corresponding to the respective MO, MC, AO and AC switches 2a to 2d. Further, plungers corresponding to the MO switch 2a and the MC switch 2b may be longer than plungers corresponding to the AO switch 2c and the AC switch 2d. Further, four pressing parts which press the respective plungers may be disposed on the holding operation knob 21. In this case, the holding operation knob 21 may be operated to swing by one stage in the pushing-down direction or the pulling-up direction to press the plunger by the pressing part for the MO switch 2a or the pressing part for the MC switch 2b to turn on the MO switch 2a or the MC switch 2b. Further, the holding operation knob 21 may be operated to swing by two stages in the pushing-down direction or the pulling-up direction to press the plunger by the pressing part for the AO switch 2c or the pressing part for the AC switch 2d to turn on the AO switch 2c or the AC switch 2d.

For example, a slide switch system may be employed. Specifically, the displacement in the up-down direction of the holding operation knob 21 may be converted into the displacement in the horizontal direction of a slider on a main board by a conversion member such as a lever to turn on or off a movable contact disposed on the slider and a fixed contact disposed on the main board.

As illustrated in FIG. 4, the above embodiment shows an example in which the holding operation knob 21 is formed in a shape that can be held in a wrapped state with the hand Hr. However, the present invention is not limited only thereto. For example, a depression may be formed at a position with which each of the fingers F2 to F5 comes into contact. Alternatively, a recess or a projection may be formed on the upper face 12u of the holding operation knob 21 so as to allow the palm or the base part of each of the fingers F2 to F5 to easily fit. Alternatively, the holding operation knob 21 may be formed in a shape that can be easily held such as an oval shape and a ball shape.

The above embodiment shows an example in which the engagement part 21a is formed on the front part of the holding operation knob 21, the engagement part 21a projecting forward in a circular arc shape to be engaged with the fingers F2 to F5 other than the thumb F1 of the hand Hr with the fingers F2 to F5 bent. However, the present invention is not limited only thereto. For example, an engagement part which includes a projection projecting forward in a circular arc shape and a recess located below the projection to put the tips of the fingers F2 to F5 thereon may be formed on the front part of the holding operation knob 21. That is, it is only required to form a holding operation knob or an engagement part of the holding operation knob in a shape that can be easily operated by applying a force from the hand or fingers.

The above embodiment shows an example in which the display 4 which displays the window 9a, 9b, 9c or 9d selected by the window selection switch 3 is disposed on the bezel 14 near the holding operation knob 21 in front thereof. However, the present invention is not limited only thereto. For example, a display which displays a window selected by the window selection switch may be disposed on an instrument panel located on the front side of the vehicle or the other operation panels.

The above embodiment shows an example in which the window selection switch 3 is capable of selecting each of the windows for the driver seat Sd, the front passenger seat, the rear right seat and the rear left seat or all the windows. However, the present invention is not limited only thereto. For example, the ALL switch 3e and the operation part 34e of the window selection switch 3 may be omitted so that any one of the windows for the driver seat Sd, the front passenger seat, the rear right seat and the rear left seat can be selected. Alternatively, two or more of the operation parts 34a to 34d may be simultaneously pressed so that windows for two or more of the seats can be selected. Alternatively, the DR switch 3a and the operation part 34a may be omitted and the window 9a for the driver seat Sd may be opened or closed when the holding operation knob 21 of the window opening/closing switch 2 is operated to swing with the other operation parts 34b to 34e unoperated and the other switches 3b to 3e off.

The above embodiment shows an example in which each of the operation parts 34a to 34e of the window selection switch 3 is composed of a push button. However, these operation parts 34a to 34e may be disposed on a single touch panel. The shape of an operation surface on which the operation parts 34a to 34e are arranged is not limited to a circular shape illustrated in FIG. 3, and may be a square shape, a rectangular shape, an elliptical shape, or a cross shape.

The above embodiment shows an example in which the present invention is applied to the power window switch device 10 which operates the opening/closing of the windows 9a to 9d for the driver seat Sd, the front passenger seat, and the rear right seat, and the rear left seat in the automatic four-wheel vehicle with a right-hand steering wheel. However, the present invention is not limited thereto. The present invention can also be applied to a power window switch device which operates the opening/closing of a plurality of windows in a vehicle.

A vehicle component to be an operation target is not limited to a window, and may be a door mirror or a lock mechanism for a door. Thus, the present invention can be applied not only to a power window switch device, but also to a vehicle switch device provided with an operation switch which operates various vehicle components mounted on the vehicle, such as a door mirror switch device which operates the opening/closing or the angle of a door mirror, a door lock switch device which operates the lock and lock release for a door, and a window lock switch device which operates the opening/closing prohibition for a window. The present invention can be applied not only to a single vehicle switch device, but also to a plurality of vehicle switch devices, for example, when not only a window selection switch, but also an operation part of a window lock switch or a door lock switch is disposed on the side face of a holding operation knob of a power window switch device.

The invention claimed is:

1. A vehicle switch device comprising:
   a selection switch comprising an operation part that, when operated, selects at least one of a plurality of driving target vehicle components mounted on a vehicle; and
   an operation switch that is separately operable from the selection switch, and drives the selected driving target vehicle component when operated,
   wherein the operation switch comprises a single holding operation knob that swings so as to have a front portion thereof pushed down or pulled up,
   wherein the single holding operation knob is structured to allow a palm of a hand to be placed on an upper face thereof, fingers of the hand other than a thumb to be placed on the front portion,
   wherein the operation part is disposed on a side face of the holding operation knob,
   wherein the operation part is positioned so as to allow the thumb of the hand to reach while the palm is placed on the upper face and the fingers other than the thumb is placed on the front portion,
   wherein the holding operation knob is disposed on an armrest of a door for a driver seat in the vehicle,
   wherein an engagement part configured to be engaged with fingers other than the thumb of the hand is formed on a front part of the holding operation knob,
   wherein the holding operation knob is held by putting the palm of the hand on the upper face of the holding operation knob and engaging the fingers other than the thumb of the hand with the engagement part with the fingers bent,
   wherein the vehicle component is a window for each seat in the vehicle,
   wherein the vehicle switch device is a power window switch device configured to open and close the window,
   wherein the operation switch is a window opening/closing switch configured to be operated for opening and closing the window,
   wherein the selection switch is a window selection switch configured to be operated for selecting an opening/closing target window,
   wherein the holding operation knob is configured to be operated to swing by two stages in a pushing-down direction and a pulling-up direction,
   wherein the holding operation knob is operated to swing by one stage in the pushing-down direction or the pulling-up direction to open or close a window selected by the window selection switch during the operation, and
   wherein the holding operation knob is operated to swing by two stages in the pushing-down direction or the pulling-up direction to fully open or fully close the window selected by the window selection switch.

2. The vehicle switch device according to claim 1, wherein a window for a driver seat, a window for a front passenger seat, a window for a rear right seat, or a window for a rear left seat can be selected by operating the operation part of the window selection switch.

3. The vehicle switch device according to claim 1, further comprising a display configured to display a window selected by the window selection switch, wherein the display is disposed in front of the holding operation knob so as to be visually recognizable from a holding direction of the holding operation knob.

* * * * *